United States Patent [19]

Fyles et al.

[11] Patent Number: 5,827,344
[45] Date of Patent: Oct. 27, 1998

[54] METHOD OF MAKING GLASS

[75] Inventors: Kenneth Melvin Fyles, Lancashire; Helen Louise Eaves, Cheshire; Thomas Gordon Cochrane, Lancashire, all of United Kingdom

[73] Assignee: Pilkington PLC, St. Helens, United Kingdom

[21] Appl. No.: 786,568

[22] Filed: Jan. 21, 1997

[30] Foreign Application Priority Data

Jan. 30, 1996 [GB] United Kingdom ............... 01780/96

[51] Int. Cl.⁶ .............................. C03B 5/26; C03B 5/16; C03B 5/18; C03B 5/28
[52] U.S. Cl. ..................... 65/134.1; 65/121; 65/134.3
[58] Field of Search ................... 65/29.12, 121, 65/134.1, 134.3, 134.5, 134.9, 145

[56] References Cited

U.S. PATENT DOCUMENTS

| | | | |
|---|---|---|---|
| 1,941,392 | 12/1933 | Engels | 65/145 |
| 4,339,541 | 7/1982 | Dela Ruye | 501/71 |
| 4,792,536 | 12/1988 | Pecoraro et al. | 501/70 |
| 5,023,210 | 6/1991 | Krumwiede et al. | 501/71 |
| 5,385,872 | 1/1995 | Gulotta et al. | 501/71 |
| 5,478,783 | 12/1995 | Higby et al. | 501/27 |
| 5,558,942 | 9/1996 | Itoh et al. | 428/426 |
| 5,588,978 | 12/1996 | Argent et al. | 65/29.1 |
| 5,593,929 | 1/1997 | Krumwiede et al. | 501/70 |

*Primary Examiner*—Stanley S. Silverman
*Assistant Examiner*—Jacqueline A. Ruller
*Attorney, Agent, or Firm*—Howrey & Simon

[57] ABSTRACT

A method of making glass in which a first glass composition is fed to a furnace and the densities of such glass is determined. The composition is then changed to produce a second glass which has substantially different properties from the first glass, the change to the composition being such that the desired properties are produced in the second glass while simultaneously maintaining the densities of the second glass substantially equal to that of the second glass. The first glass may be a clear glass while the second glass may be a tinted glass. In such a case, the tinted glass may contain iron and the densities are maintained substantially equal by utilizing the iron to replace calcium oxide in the clear glass composition.

16 Claims, No Drawings

METHOD OF MAKING GLASS

FIELD OF THE INVENTION

The present invention relates to a method of making glass. More particularly, the present invention relates to a method of making glass preferably, but not essentially, by the float process which permits the changeover time from making a clear glass to a tinted glass and vice versa to be considerably shortened.

BACKGROUND OF THE INVENTION AND PRIOR ART DISCUSSION

It is well known to make both clear and tinted glasses by the float process. At the present time, tinted glasses are much used in automotive vehicles. Such tinted glasses are not provided simply for aesthetic reasons. Clear glass does, of course, provide excellent luminous radiation transmission but has the consequential drawback of permitting other, unwanted radiation to enter the interior of the vehicle. Thus solar heat radiation, in both the visible and infra-red regions of the electromagnetic spectrum, can cause the temperature in the interior of the vehicle to become sufficiently high as to cause discomfort to the occupants and/or damage to goods being transported. Moreover, clear glass allows a high proportion of ultraviolet radiation to pass therethrough and it is well known that such radiation causes the embrittling of plastics materials and the fading of the colours of fabrics in the interior of the vehicle.

To alleviate these problems, it is well known to add colorants to the basic, clear glass composition. In particular, it is extremely well known to employ iron oxide as the colorant Iron oxide ($Fe_2O_3$) is particularly beneficial because it contains iron in both the ferric and ferrous states. Ferric iron reduces the amount of ultraviolet radiation that is transmitted through the glass whilst ferrous iron absorbs radiation in the near infra-red region at about 1050 nm.

However, the use of iron oxide does have disadvantageous side effects. In particular, it increases the densities of the glass. The most obvious drawback of this is that the weight of the vehicle in which the glass is incorporated is increased. From a manufacturing point of view, particularly on a float line, a far more serious problem manifests itself. For commercial reasons float lines are not usually dedicated to making one particular type of glass. For example, a float line may be used for making clear glass, then for making a tinted glass and then restored to making clear glass. It will be readily appreciated that the changeover cannot be effected instantaneously.

When a changeover from clear glass to a tinted glass is made, the tinted glass will not be of the desired quality until all of the colorant is uniformly incorporated in, that is to say, mixed into, the glass. It takes longer for this to be achieved if certain colorant materials, such as iron oxide, are used. Similarly, when the reverse changeover is made, the clear glass must be completely clear. In other words, there must not be any streaks of colour in the glass.

When the changeover from clear to tint is effected, the changeover is retarded by the fact that the colorant has a higher densities than the molten clear glass and tends to sink to the bottom of the melter. The mixing of the colorant with the clear glass constituents is, therefore, somewhat inefficient and takes a considerable length of time to optimise itself. Until optimal mixing is attained, the tinted glass will not be of an acceptable commercial quality. When the run of making tinted glass is completed, the colorant again tends to settle on the bottom of the tank and is only removed slowly therefrom. These changeover times, particularly the changeover from tinted glass to clear glass can be very long, of the order of weeks. From a commercial point of view, this represents a significant disadvantage.

A further problem is that of devitrification. When making a tinted glass, particularly one containing iron oxide, there is a greater tendency for a build-up of devitrified glass on the bottom of the furnace at the working end to occur.

The problems of incomplete mixing and devitrification are, in glass-making terms, problems on a macro-scale. There is also a minor-scale problem which occurs when the composition of the glass is changed, such as when there is a change-over in a furnace from making one kind of glass to a second kind of glass. This is the problem of changes occuring in the refractive index within the glass being formed and is commonly known as "ream". This manifests itself in the form of optical distortion when one looks through the glass.

Still further, and alluded to above, vehicle manufacturers require the glass which they use in their vehicles to have ever lower weight but still to have the particular radiation transmission or absorption properties. Accordingly, glass manufacturers are attempting to make thinner glass having the desired properties. According to the Lambert-Beer law, the thickness of a glass (or the concentration of a colorant species) is linked with the visible transmission of the glass. In essence, this states that as the thickness of the glass is halved, the internal optical density of the glass will also halve. Accordingly, in order to make a glass having a thickness of 2 mm having the same radiation transmission or absorption properties as a glass having a thickness of 4 mm, it is usually necessary to double the concentration of the colorant. Of course, if the concentration of the colorant is doubled, the problems outlined above caused by the higher densities of the colorant compared with that of the clear glass composition are exacerbated.

OBJECTS OF THE INVENTION

The present invention therefore seeks to provide a method of making glass in which the above-described problems are at least minimized. In particular, the present invention seeks to provide a method of making glass so that the changeover time when a float line is changed from making a first type of glass to a second type of glass is substantially reduced.

SUMMARY OF THE INVENTION

According to the present invention, there is therefore provided a method of making glass comprising the steps of producing a first glass in a furnace, measuring the densities of the glass thus produced and altering the composition fed to the furnace such that a further glass having significantly different properties from the first glass is produced, wherein the alteration to the composition is so selected as to produce the desired properties in the further glass whilst simultaneously maintaining the densities of the further glass substantially equal to that of the first glass.

We have surprisingly found that if the compositions of the different glasses made in a particular furnace are selected so that the densities of all of the glasses made in that furnace, measured at 25° C., are substantially the same, the changeover from making one commercially acceptable glass to another commercially acceptable glass can be effected much more rapidly. The term "substantially the same densities" is defined as meaning that the densities are within 0.01, preferably within 0.005, of one another. Moreover, we have found that if the densities of the different glasses are matched, the refractive indices tend also to be more closely matched. Accordingly, we have found that, by carrying out the method of the present invention, the problem of ream may also be alleviated.

Preferably, the first glass is a clear glass and the further glass is a tinted glass containing iron.

Alternatively, both said first and second glasses contain $Fe_2O_3$ characterised in that the densities of the two glasses are made substantially constant by reducing the CaO content in the glass containing more $Fe_2O_3$ relative to the glass containing less $Fe_2O_3$.

Glass used in vehicles and buildings is usually of the soda-lime-silica type and the major constituents thereof are $SiO_2$, $Na_2O$, CaO, MgO, $K_2O$ and $Al_2O_3$. Of these, the lightest component is $SiO_2$ which, when fused, has a densities of approximately 2.2. Most glass manufacturers have a basic clear glass composition which they maintain substantially consistent. If they then wish to make a tinted glass containing iron, this is effected in one of two ways. Firstly the composition may be modified by selecting the appropriate amount of iron oxide to be added (in weight %) and reducing the amount of $SiO_2$ present in the composition by the same amount. Alternatively, the iron oxide may simply be added to the other constituents of the clear glass composition. It will be readily apparent that, if the amounts are calculated in weight %, this latter procedure has the effect of slightly reducing the weight percentage of all of the components originally present We have found that each of the constituents of a glass making mixture have an effect on the densities of the glass which is produced. Whilst this may appear, at first sight, to be self-evident, we have surprisingly found that the effects produced are not predictable. For example, the densities of iron oxide, in the form of $Fe_2O_3$, and CaO are approximately 5.2 and 3.2 respectively. However, for each weight percent of $Fe_2O_3$ used to replace one weight percent of $SiO_2$, the densities of the glass rises by approximately 0.0150. For each weight percent of CaO used to replace one weight percent of $SiO_2$, the densities rises by 0.0149. This is totally unexpected on the basis of the densities of the $Fe_2O_3$ and the CaO. Similarly, from their densities, one would expect $K_2O$ to have a greater effect on the density of the glass than $Na_2O$. However, again referring to the replacement of one weight percent of $SiO_2$ by one weight percent of each of these alkali metal oxides, we have found that the sodium oxide increases the densities of the glass by 0.0078 whilst the potassium oxide only increases it by 0.0056.

From the above, it will be readily apparent that if the tinted glass is to contain $Fe_2O_3$ in relatively large amounts— say from 0.7 to 5 weight %—the densities of the glass would be substantially increased if the usual procedure of reducing the amount of $SiO_2$ in an amount corresponding to that of the iron oxide added were adopted. However, it will be equally apparent from the above discussion that if the amount of CaO is reduced by an amount corresponding to the amount of $Fe_2O_3$ added, the effect on the densities will be very small (an increase of approximately 0.0001 per weight percent of $Fe_2O_3$ added).

However, particularly if there is a large amount of iron in the tinted glass, a straight exchange of $Fe_2O_3$ for CaO can give rise to problems. In particular, although lowering the amount of CaO lessens the chance of devitrification due to wollastonite (calcium silicate) occurring, too low an amount of calcium present tends to encourage the formation of phases such as diopside or silica-rich primary phases such as tridymite. Both of these are harder to remove than wollastonite, particularly the silica-rich phases.

Accordingly, it may be preferred if the MgO content is simultaneously reduced along with the CaO. The removal of calcium oxide and/or magnesium oxide can lead to a change in the working temperature (also known as the log4 viscosity because this is the temperature at which the glass has a viscosity of $10^4$ poise). Since a change in the working temperature is not usually regarded as desirable by glass manufacturers because it may necessitate physical changes to other parameters it may therefore be desirable if this is counterbalanced by a slight increase in the amount of $Na_2O$ and $K_2O$ in the composition.

In a particularly preferred embodiment of the present invention, the first glass contains A% CaO, B% MgO, C% $Na_2O$ plus $K_2O$ and D% $SiO_2$ plus $Al_2O_3$, and the second glass contains X% total iron (expressed as $Fe_2O_3$), (A−0.5X)% to (A−1.5X)% CaO, B% to (B−X)% MgO with the proviso that the amount of MgO tends to (B−X) when the change in CaO is least, C to (C+0.5X) $Na_2O$ plus $K_2O$ and D% $SiO_2$ plus $Al_2O_3$ with sufficient changes to cause the total contents to be 100 weight %.

As previously mentioned, the tinted glasses are intended, in most cases to be so-called "high performance glasses", that is to say, they have low infra-red and ultraviolet radiation transmittance. In a particularly preferred embodiment of the present invention, the glasses are primarily intended for use as either privacy glazing or as the glazing for a sunroof in a vehicle. To produce such glazing, the iron content in the composition needs to be relatively high and the method of the present invention is particularly useful in preparing glass wherein the iron oxide content is in excess of 0.7 weight percent and may be as high as 5 weight percent.

Other colorants may be used in association with the iron oxide. Examples of such colorants are selenium, nickel oxide and cobalt oxide. Even though these have relatively high molecular weights, the amounts which are used are relatively small, of the order of 500 ppm or less and such small amounts have such a small effect on the densities of the finished glass that, for the practical purposes of the present invention, they can be ignored.

If the amount of calcium oxide is reduced as the amount of iron oxide is increased, the working temperature of the glass remains substantially the same. However, the liquidus temperature, that is to say, the temperature at which the glass will begin to crystallise under equilibrium conditions, will drop. This is because magnesium calcium silicate (diopside) is then formed as the primary or highest temperature phase as the amount of calcium in the glass is reduced. This aspect of the present invention therefore helps to prevent a build-up of devitrified glass. Devitrification is a common problem in glasses containing high amounts of iron oxide. The working range, which is the difference between the working temperature and the liquidus temperature, is thereby increased. This latter is of importance because it means that it is easier to form the glass without crystallisation occurring and the amount of devitrification is reduced or even eliminated completely.

In another aspect of the present invention, there is provided a high soda-lime-silica glass for the production of vehicle windows having a low Direct Solar Heat Transmission by virtue of the presence of colorants including the iron, characterised in that the composition contains a reduced proportion of alkaline earth metal oxides. In a preferred embodiment, the glass contains more than 2.0 weight % iron calculated as $Fe_2O_3$ and less than 12 weight % alkaline earth metal oxides. Advantageously, the alkaline earth metal oxide content is below 11% and, desirably, the iron content is less than 2.5 weight %, calculated as $Fe_2O_3$. Glasses of this type preferably have a working range of at least 9C.

Although high iron content glasses have been made hitherto, such glasses have either not had the desired optical properties or have caused production difficulties of the types detailed hereinbefore. We have surprisingly found that, by reducing the amount of alkaline earth metal oxides present in high iron glasses to below, for example 12%, the production difficulties are overcome whilst the optical properties are attained.

DESCRIPTION OF PREFERRED EMBODIMENTS

The invention will be further described, by way of example only, with reference to the following non-limitative Examples appearing in the following Tables. In the tables:

The ferrous state is the amount of FeO (expressed as $Fe_2O_3$), divided by the total iron oxide (expressed as $Fe_2O_3$).

Illuminant A transmission represents the power distribution of tungsten filament according to the 1931 Observer set.

DSHT (Direct Solar Heat Transmission) refers to solar heat transmission integrated over the wavelength range 350 to 2100 nm according to the relative solar spectral distribution Parry Moon for air mass 2 direct, as detailed in ISO 9050.

UVT (ISO) for the measurement of ultraviolet radiation over the wavelength range 280–380 nm (air mass 2 global) is from standard ISO 9050.

UVT (PM) is the measurement of ultraviolet radiation over the wavelength range 300 to 400 nm derived from the factors published by Parry Moon in the Journal of the Franklin Institute 230 pp 583–617, 1940.

a* and b* are colour co-ordinates derived using the CieLAB co-ordinate system.

The log 4 viscosity temperature is the temperature in degrees Celsius at which the glass has a viscosity of 10,000 poise.

The liquidus temperature is determined by placing glass grains in a gradient furnace for 16 hours then measuring the hottest temperature at which crystal growth occurs.

Density is the mass per unit volume in grams per cubic centimeter at 25° C. measured using the Archimedes method.

W=Wollastonite
Di=Diopside
De=Devitrite
Si=Silica
Nd=Refractive Index

TABLE 1

| Example | 1 | 2a | 2b | 3 | 4 | 5 | 6 | 7 |
|---|---|---|---|---|---|---|---|---|
| $SiO_2$ | 72.7 | 71.77 | 71.4 | 72.7 | 72.7 | 72.2 | 72.7 | 72.7 |
| $Al_2O_3$ | 1.0 | 0.987 | 1.0 | 1.0 | 1.0 | 1.0 | 1.0 | 1.0 |
| $Na_2O$ | 13.0 | 12.833 | 13.0 | 13.0 | 13.0 | 13.5 | 13.0 | 13.0 |
| $K_2O$ | 0.6 | 0.592 | 0.6 | 0.6 | 0.6 | 0.6 | 0.6 | 0.6 |
| MgO | 4.0 | 3.949 | 4.0 | 4.0 | 3.8 | 3.8 | 3.4 | 2.8 |
| CaO | 8.4 | 8.292 | 8.4 | 7.2 | 7.4 | 7.4 | 7.8 | 8.4 |
| $SO_3$ | 0.2 | 0.2 | 0.2 | 0.2 | 0.2 | 0.2 | 0.2 | 0.2 |
| $Fe_2O_3$ | 0.1 | 1.3 | 1.3 | 1.3 | 1.3 | 1.3 | 1.3 | 1.3 |
| Ferrous state | 20% | 22% | 22% | | | | | |
| Ill. A Trans | | | | | | | | |
| DSHT | | | | | | | | |
| UVT (ISO) | | | | | | | | |
| UVT (PM) | | | | | | | | |
| a* | | | | | | | | |
| b* | | | | | | | | |
| dom λ nm | | | | | | | | |
| Colour Purity % | | | | | | | | |
| log4 visc. temp. °C. | 1037 | (1033) | (1028) | 1037 | 1038 | 1030 | 1034 | 1032 |
| Liquidus Temp. ($T_1$) | 1000 W | 1000 W 998 Di | | 982 Di 964 De | 982 W 976 Di | 980 W | 990 W 963 De | 998 W |
| $T_w$ – $T_1$ | +36° C. | +33° C. | +28° C. | +55° C. | +56° C. | +50° C. | +44° C. | +34° C. |
| Densities | 2.4910 | 2.5086 | 2.5103 | 2.4925 | 2.4941 | 2.4987 | 2.4963 | 2.4996 |
| Refractive Index (Nd) | 1.5180 | 1.5224 | 1.5230 | 1.5188 | 1.5188 | 1.5194 | 1.5197 | 1.5207 |

| Example | 8 | 9 | 10 | 11 | 12 | 13 | 14 | 15 |
|---|---|---|---|---|---|---|---|---|
| $SiO_2$ | 71.14 | 72.7 | 72.7 | 72.2 | 72.4 | 72.7 | 72.7 | 72.7 |
| $Al_2O_3$ | 0.98 | 1.0 | 1.0 | 1.5 | 1.5 | 1.0 | 1.0 | 1.0 |
| $Na_2O$ | 12.72 | 13.0 | 13.0 | 14.1 | 14.2 | 13.0 | 13.0 | 13.0 |
| $K_2O$ | 0.587 | 0.6 | 0.6 | 0.6 | 1.0 | 0.6 | 0.6 | 0.6 |
| MgO | 3.91 | 3.4 | 3.4 | 4.0 | 1.0 | 3.6 | 3.0 | 0 |
| CaO | 8.22 | 6.8 | 6.8 | 5.1 | 7.4 | 7.1 | 5.4 | 8.4 |
| $SO_3$ | 0.2 | 0.2 | 0.2 | 0.2 | 0.2 | 0.2 | 0.2 | 0.2 |
| $Fe_2O_3$ | 2.2 | 2.2 | 2.2 | 2.2 | 2.2 | 1.7 | 4.0 | 4.0 |
| Ferrous state | 22% | 22% | 30% | 22% | 33% | 33% | 22.4% | 21% |
| $Co_3O_4$ | 295 | 275 | 235 | 285 | 235 | 90 | 500 | 500 |
| Se | 15 | 16 | 17 | 24 | 18 | 10 | 20 | 13 |
| NiO | 250 | 250 | 75 | 150 | 0 | 50 | 400 | 400 |
| Ill. A Trans | 28.1 | 31.5 | 32.0 | 28.5 | 34.1 | 51.5 | 11.0 | 16.0 |
| DSHT | 20.9 | 24.1 | 21.4 | 21.1 | 22 | 32.5 | 9.0 | 14.4 |

TABLE 1-continued

| | | | | | | | | |
|---|---|---|---|---|---|---|---|---|
| UVT (ISO) | 4.9 | 6.6 | 6.1 | 6.1 | 8.7 | 14.4 | 0.5 | 0.8 |
| UVT (PM) | 15.4 | 19 | 17.6 | 17.4 | 22.6 | 32 | 3.4 | 5.6 |
| a* | −7.0 | −6.4 | −6.3 | −5.8 | −7.1 | −7.6 | −7.7 | −8.9 |
| b* | −0.6 | −1.5 | −0.4 | −1.7 | −6.4 | −0.5 | +2.2 | −2.8 |
| dom λ nm | 493.7 | 492 | 494 | 491 | 486 | 494 | 507 | 491 |
| Colour Purity % | 5.7 | 6 | 4.8 | 6.1 | 11.4 | 4.2 | 4.5 | 11.1 |
| Log 4 visc. temp ° C. | (1027) | 1042 | 1042 | 1038 | 1012 | (1040) | 1044 | |
| Liquidus Temp. ($T_l$) | 1016 Di | 970 W/Di | 970 W/Di | 990 Di | 958 De | 972 W/Di | 980 Si | |
| $T_w - T_l$ | +11° C. | +72° C. | +72° C. | +48° C. | +54° C. | +68° C. | +64° C. | |
| Density | 2.5189 | 2.4951 | 2.4965 | 2.4884 | 2.4995 | 2.4944 | 2.4983 | 2.5153 |
| Refractive Index | 1.5253 | 1.5197 | 1.5197 | | 1.5202 | 1.5194 | 1.5216 | 1.5259 |

| Example | 16 | 17 | 18 | 19 | 20 | 21 | 22 |
|---|---|---|---|---|---|---|---|
| SiO₂ | 72.0 | 72.7 | 72.7 | 72.7 | 72.7 | 72.7 | 72.7 |
| Al₂O₃ | 1.9 | 1.0 | 1.0 | 1.0 | 1.0 | 1.0 | 1.0 |
| Na₂O | 15.0 | 13.0 | 13.0 | 13.0 | 13.0 | 13.0 | 13.0 |
| K₂O | 0.6 | 0.6 | 0.6 | 0.6 | 0.6 | 0.6 | 0.6 |
| MgO | 0 | 4.0 | 3.45 | 3.8 | 3.7 | 3.6 | 3.7 |
| CaO | 6.2 | 4.4 | 6.8 | 7.5 | 7.4 | 7.1 | 7.4 |
| SO₃ | 0.2 | 0.2 | 0.2 | 0.2 | 0.2 | 0.2 | 0.2 |
| Fe₂O₃ | 4.0 | 4.0 | 2.15 | 1.1 | 1.3 | 1.7 | 1.3 |
| Ferrous state | 20.5% | 21% | 26% | 27% | 23% | 34% | 27% |
| Co₃O₄ | 500 | 500 | 200 | 113 | 130 | 170 | 130 |
| Se | 43 | 12 | 26 | 19 | 15 | 21 | 10 |
| NiO | 400 | 400 | 75 | 50 | 50 | 75 | 50 |
| Ill. A Trans | 9.3 | 16.7 | 32.5 | 52 | 52.2 | 38.9 | 53.4 |
| DSHT | 8.8 | 15.1 | 23.4 | 43 | 43 | 26 | 41.5 |
| UVT (ISO) | 0.5 | 0.6 | 5.4 | 18 | 16 | 11 | 18.4 |
| UVT (PM) | 3.2 | 4.6 | 16 | 36.2 | 34.6 | 24.1 | 37.7 |
| a* | −2.8 | −10.0 | −3.9 | −1.6 | −3.2 | −5.5 | |
| b* | 5.9 | −0.2 | +4.9 | +3.2 | +0.8 | +0.9 | |
| dom λ nm | 568 | 495.8 | 561 | 586 | 498 | 498 | 490 |
| Colour Purity % | 10.7 | 8.4 | 5.1 | 2.7 | 1.5 | 3 | 4.2 |
| log4 visc. temp. °C. | 1005 | | | | | | |
| Liquidus Temp. ($T_l$) | 955 De 950 Si | | | | | | |
| $T_w - T_l$ | +50° C. | | | | | | |
| Densities | 2.5074 | 2.4899 | 2.4933 | 2.4938 | 2.4941 | 2.4947 | 2.4944 |
| Refractive Index | 1.5214 | 1.5202 | | | | | |

| Example | 23 | 24 | 25 | 26 | 27 | 28 |
|---|---|---|---|---|---|---|
| SiO₂ | 72.7 | 72.7 | 72.7 | 72.7 | 72.7 | 72.7 |
| Al₂O₃ | 1.0 | 1.0 | 1.0 | 1.0 | 1.0 | 1.0 |
| Na₂O | 13.0 | 13.0 | 13.0 | 13.0 | 13.0 | 13.0 |
| K₂O | 0.6 | 0.6 | 0.6 | 0.6 | 0.6 | 0.6 |
| MgO | 3.6 | 3.7 | 3.8 | 3.6 | 3.6 | 3.4 |
| CaO | 7.1 | 7.4 | 7.5 | 7.1 | 7.1 | 6.8 |
| SO₃ | 0.2 | 0.2 | 0.2 | 0.2 | 0.2 | 0.2 |
| Fe₂O₃ | 1.7 | 1.3 | 1.1 | 1.7 | 1.7 | 2.2 |
| Ferrous state | 27% | 27% | 28% | 36.5% | 37.5% | 28.4% |
| Co₃O₄ | 10 | 45 | 13 | 170 | 170 | 255 |
| Se | 56 | 26 | 31 | 10 | 5 | 12 |
| NiO | 75 | 50 | 50 | 75 | 75 | 150 |
| Ill. A Trans | 35 | 53 | 56 | 43.3 | 44.7 | 32.7 |
| DSHT | 27 | 39 | 43 | 28 | 28.6 | 23 |
| UVT (ISO) | 5.3 | 13.3 | 15 | 13.9 | 15.4 | 7 |
| UVT (PM) | 12 | 29.5 | 31.5 | 31 | 33.4 | 19.6 |
| a* | +8.0 | −1.0 | +1.4 | −7.9 | −8.7 | −7.7 |
| b* | +26.9 | +10.0 | +13.4 | −5.4 | −7.3 | −4.0 |
| dom λ nm | 582 | 575 | 578 | 488 | 487 | 489 |
| Colour Purity % | 38.6 | 11 | 16 | 10.0 | 12.1 | 9.3 |
| log4 visc. temp. °C. | | | | | | |
| Liquidus Temp. ($T_l$) | | | | 976 W 970 Di | | |
| $T_w - T_l$ | | | | | | |
| Densities | 2.4940 | 2.4949 | 2.4944 | 2.4961 | 2.4955 | 2.4967 |
| Refractive index | | | | | | |

| Example | 29 | 30 | 31 | 32 |
|---|---|---|---|---|
| SiO₂ | 72.6 | 72.6 | 70.6 | 70.6 |
| Al₂O₃ | 0.1 | 0.1 | 0.91 | 0.91 |
| Na₂O | 13.9 | 13.9 | 13.7 | 13.7 |

TABLE 1-continued

|  |  |  |  |  |
|---|---|---|---|---|
| $K_2O$ | 0.03 | 0.03 | 0.57 | 0.57 |
| MgO | 4.1 | 3.5 | 4.0 | 3.4 |
| CaO | 8.9 | 7.3 | 9.76 | 8.16 |
| $SO_3$ | 0.23 | 0.23 | 0.27 | 0.27 |
| $Fe_2O_3$ | 0.11 | 2.2 | 0.1 | 2.2 |
| Ferrous state | 20% | 24% | 20% | 24% |
| $Co_3O_4$ |  | 275 |  | 275 |
| Se |  | 23 |  | 22 |
| NiO |  | 250 |  | 250 |
| Ill. A Trans |  | 29.4 |  | 29 |
| DSHT |  | 23.5 |  | 23.1 |
| UVT (ISO) |  | 5.4 |  | 4.5 |
| UVT (PM) |  | 16.4 |  | 14.6 |
| a* |  | −5.1 |  | −5.4 |
| b* |  | +1.4 |  | +2.7 |
| dom λ nm |  | 503 |  | 522.2 |
| Colour Purity % |  | 2.4 |  | 2.1 |
| log4 visc. temp. °C. | 1014 | 1020 | 1000 | 1010 |
| Liquidus Temp. ($T_l$) | 1008 W | 996 Si 988 W | 1028 W | 990 W |
| $T_w - T_l$ | +6 | +24 | −28 | +20 |
| Densities | 2.5017 | 2.5017 | 2.5176 | 2.5237 |
| Refractive index | 1.5201 | 1.5221 | 1.5249 | 1.5268 |

TABLE 2

| Example | 1 | 8 | 9 | 10 | 11 | 12 | 13 | 14 |
|---|---|---|---|---|---|---|---|---|
| $SiO_2$ | 72.7 | 71.14 | 72.7 | 72.7 | 72.7 | 72.4 | 72.7 | 72.7 |
| $Al_2O_3$ | 1.0 | 0.98 | 1.0 | 1.0 | 1.5 | 1.5 | 1.0 | 1.0 |
| $Na_2O$ | 13.0 | 12.72 | 13.0 | 13.0 | 14.1 | 14.2 | 13.0 | 13.0 |
| $K_2O$ | 0.6 | 0.587 | 0.6 | 0.6 | 0.6 | 1.0 | 0.6 | 0.6 |
| MgO | 4.0 | 3.91 | 3.4 | 3.4 | 4.0 | 1.0 | 3.6 | 3.0 |
| CaO | 8.4 | 8.22 | 6.8 | 6.8 | 5.1 | 7.4 | 7.1 | 5.4 |
| $SO_3$ | 0.2 | 0.2 | 0.2 | 0.2 | 0.2 | 0.2 | 0.2 | 0.2 |
| $Fe_2O_3$ | 0.1 | 2.2 | 2.2 | 2.2 | 2.2 | 2.2 | 1.7 | 4.0 |
| Ferrous state | 20% | 22% | 22% | 30% | 22% | 33% | 33% | 22.4% |
| $Co_3O_4$ |  | 295 | 275 | 235 | 285 | 235 | 90 | 500 |
| Se |  | 15 | 16 | 17 | 24 | 18 | 10 | 20 |
| NiO |  | 250 | 250 | 75 | 150 | 0 | 50 | 400 |
| Ill. A Trans |  | 8.7 | 10.7 | 11.2 | 9 | 12.9 | 29.2 | 1.4 |
| DSHT |  | 5.6 | 7.1 | 6.3 | 5.8 | 7.2 | 14.9 | 1.1 |
| UVT (ISO) |  | 0.7 | 1.1 | 1.0 | 0.9 | 1.9 | 4.6 | 0 |
| UVT (PM) |  | 3.9 | 5.5 | 4.9 | 4.8 | 7.8 | 14.7 | 0.3 |
| a* |  | −9.1 | −8.7 | −8.6 | −7.5 | −9.4 | −12.1 | −7.3 |
| b* |  | −0.6 | −1.9 | −0.4 | −2.1 | −9.1 | −0.6 | +2.4 |
| dom λ nm |  | 494.9 | 492.3 | 495.2 | 491.4 | 486 | 495.1 | 510.7 |
| Colour Purity % |  | 10.1 | 11.0 | 8.6 | 10.9 | 20.8 | 8.9 | 8.2 |
| Log 4 visc. temp °C. | 1037 |  | 1042 |  | 1.038 | 1012 |  | 1044 |
| Liquidus Temp. ($T_l$) | 1000 W | 1016 Di |  | 970 W/Di | 990 Di | 958 De | 972 W/Di | 980 Si |
| $T_w - T_l$ | +36° C. |  |  |  | +48° C. | +54° C. |  |  |
| Densities | 2.4910 | 2.5189 | 2.4951 | 2.4965 | 2.4884 | 2.4995 | 2.4944 | 2.4983 |
| Refractive Index | 1.5180 |  |  |  |  |  |  |  |

| Example | 15 | 16 | 17 | 18 | 19 | 20 | 21 |
|---|---|---|---|---|---|---|---|
| $SiO_2$ | 72.7 | 72.0 | 72.7 | 72.7 | 72.7 | 72.7 | 72.7 |
| $Al_2O_3$ | 1.0 | 1.9 | 1.0 | 1.0 | 1.0 | 1.0 | 1.0 |
| $Na_2O$ | 13.0 | 15.0 | 13.0 | 13.0 | 13.0 | 13.0 | 13.0 |
| $K_2O$ | 0.6 | 0.6 | 0.6 | 0.6 | 0.6 | 0.6 | 0.6 |
| MgO | 0 | 0 | 4.0 | 3.45 | 3.8 | 3.7 | 3.6 |
| CaO | 8.4 | 6.2 | 4.4 | 6.8 | 7.5 | 7.4 | 7.1 |
| $SO_3$ | 0.2 | 0.2 | 0.2 | 0.2 | 0.2 | 0.2 | 0.2 |
| $Fe_2O_3$ | 4.0 | 4.0 | 4.0 | 2.15 | 1.1 | 1.3 | 1.7 |
| Ferrous state | 21% | 20.3% | 21% | 26% | 27% | 23% | 34% |
| $Co_3O_4$ | 500 | 500 | 500 | 200 | 113 | 130 | 170 |
| Se | 13 | 43 | 12 | 26 | 19 | 15 | 21 |
| NiO | 400 | 400 | 400 | 75 | 50 | 50 | 75 |
| Ill. A Trans | 2.9 | 1.0 | 2.7 | 11.6 | 29.9 | 29.9 | 16.6 |
| DSHT | 2.7 | 1.1 | 2.5 | 7.0 | 21.6 | 21.4 | 9.2 |
| UVT (ISO) | 0 | 0 | 0 | 0.8 | 6.7 | 5.7 | 2.6 |
| UVT (PM) | 0.6 | 0.2 | 0.4 | 4.1 | 18 | 17 | 8.7 |

TABLE 2-continued

| | | | | | | | |
|---|---|---|---|---|---|---|---|
| a* | −9.5 | −2.5 | −10.8 | −5.5 | −2.6 | −5.3 | −8.1 |
| b* | −3.2 | 5.1 | 0 | +6.9 | +5.3 | +1.2 | +1.4 |
| dom λ nm | 491 | 568 | 496.8 | 561.4 | 568 | 501.2 | 500.9 |
| Colour Purity % | 20.2 | 22.5 | 15.4 | 10.9 | 6.2 | 2.7 | 5.1 |
| log4 visc. temp. °C. | | 1005 | | | | | |
| Liquidus Temp. ($T_l$) | | 955 De 950 Si | | | | | |
| $T_w - T_l$ | | +50° C. | | | | | |
| Densities | 2.5153 | 2.5074 | 2.4899 | 2.4933 | 2.4938 | 2.4941 | 2.4947 |
| Refractive Index | | | | | | | |

| Example | 22 | 23 | 24 | 25 | 26 | 27 | 28 |
|---|---|---|---|---|---|---|---|
| $SiO_2$ | 72.7 | 72.7 | 72.7 | 72.7 | 72.7 | 72.7 | 72.7 |
| $Al_2O_3$ | 1.0 | 1.0 | 1.0 | 1.0 | 1.0 | 1.0 | 1.0 |
| $Na_2O$ | 13.0 | 13.0 | 13.0 | 13.0 | 13.0 | 13.0 | 13.0 |
| $K_2O$ | 0.6 | 0.6 | 0.6 | 0.6 | 0.6 | 0.6 | 0.6 |
| MgO | 3.7 | 3.6 | 3.7 | 3.8 | 3.6 | 3.6 | 3.4 |
| CaO | 7.4 | 7.1 | 7.4 | 7.5 | 7.1 | 7.1 | 6.8 |
| $SO_3$ | 0.2 | 0.2 | 0.2 | 0.2 | 0.2 | 0.2 | 0.2 |
| $Fe_2O_3$ | 1.3 | 1.7 | 1.3 | 1.1 | 1.7 | 1.7 | 2.2 |
| Ferrous state | 27% | 27% | 27% | 28% | 36.5% | 37.5% | 28.4% |
| $Co_3O_4$ | 130 | 10 | 45 | 13 | 170 | 170 | 255 |
| Se | 10 | 56 | 26 | 31 | 10 | 5 | 12 |
| NiO | 50 | 75 | 50 | 50 | 75 | 75 | 150 |
| Ill. A Trans | 31.2 | 13.7 | 31.3 | 34.2 | 20.8 | 22.3 | 11.9 |
| DSHT | 20.6 | 8.9 | 18.8 | 21.6 | 11.4 | 12.2 | 7.1 |
| UVT (ISO) | 7.1 | 0.5 | 4.3 | 4.9 | 4.3 | 5.1 | 1.2 |
| UVT (PM) | 19.7 | 2.1 | 13 | 13.8 | 13.8 | 15.8 | 6.1 |
| a* | −7.2 | +13.3 | −1.2 | +3.2 | −11.6 | −12.5 | −10.3 |
| b* | −2.5 | +35.7 | +15.9 | +21.9 | −8.2 | −11.4 | −5.4 |
| dom λ nm | 490.4 | 584.1 | 575 | 578.8 | 487.5 | 486.3 | 489 |
| Colour Purity % | 7.5 | 67.1 | 21.8 | 30.7 | 18.3 | 22.1 | 16.9 |
| log4 visc. temp. °C. | | | | | 976 W 970 Di | | |
| Liquidus Temp. ($T_l$) | | | | | | | |
| $T_w - T_l$ | | | | | | | |
| Densities | 2.4944 | 2.4940 | 2.4949 | 2.4944 | 2.4961 | 2.4955 | 2.4967 |
| Refractive Index | | | | | | | |

| Example | 29 | 30 | 31 | 32 |
|---|---|---|---|---|
| $SiO_2$ | | 72.6 | 72.6 | 70.6 | 70.6 |
| $Al_2O_3$ | | 0.1 | 0.1 | 0.91 | 0.91 |
| $Na_2O$ | | 13.9 | 13.9 | 13.7 | 13.7 |
| $K_2O$ | | 0.03 | 0.03 | 0.57 | 0.57 |
| MgO | | 4.1 | 3.5 | 4.0 | 3.4 |
| CaO | | 8.9 | 7.3 | 9.76 | 8.16 |
| $SO_3$ | | 0.23 | 0.23 | 0.27 | 0.27 |
| $Fe_2O_3$ | | 0.11 | 2.2 | 0.1 | 2.2 |
| Ferrous state | | 20% | 24% | 20% | 24% |
| $Co_3O_4$ | | | 275 | | 275 |
| Se | | | 23 | | 22 |
| NiO | | | 250 | | 250 |
| Ill. A Trans | | | 9.5 | | 9.3 |
| DSHT | | | 6.8 | | 6.5 |
| UVT (ISO) | | | 0.8 | | 0.6 |
| UVT (PM) | | | 4.4 | | 3.6 |
| a* | | | −6.9 | | −7.2 |
| b* | | | +2.1 | | +3.8 |
| dom λ nm | | | 507.7 | | 530 |
| Colour Purity % | | | 4.2 | | 5 |
| log4 visc. temp. °C. | | 1014 | 1020 | 1000 | 1010 |
| Liquidus Temp. ($T_l$) | | 1008 W | 996 Si 988 W | 1028 W | 990 W |
| $T_w - T_l$ | | +6 | | −28 | +20 |
| Densities | | 2.5017 | 2.5017 | 2.5176 | 2.5237 |
| Refractive Index | | 1.5201 | | 1.5249 | |

In Table 1, there are shown the compositions and spectral properties of a variety of glasses in a 2 mm thickness. In Table 2, the spectral properties of the glasses having the compositions shown in Table 1 are given, but at a thickness of 4 mm.

In Table 1, Example 1 is an example of a clear float glass containing an amount of iron oxide at an impurity level. Examples 2a and 2b are glasses containing 1.2 weight percent $Fe_2O_3$ added to the basic composition of Example 1. In Example 2a, in accordance with one of the known techniques described hereinbefore, the total weight percentage of the composition is now notionally 101.2 and this must obviously be re-calculated to bring the total back to 100%. Example 2b shows a similar composition to Example 2a but, in this case, the extra 1.2 weight percent $Fe_2O_3$ has been added at the expense of $SiO_2$. All of the other Examples up to and including Example 28 with the exceptions of Example 8 (similar to Example 2a), Example 15 (in which the iron oxide has been added at the expense of MgO rather than CaO) and Example 16 (in which all of the MgO and some CaO has been removed and has been replaced by the iron oxide) are compositions for use in the present invention in which the densities of the iron oxide containing glass has been balanced with the densities of the clear glass shown in Example 1. Examples 9 to 11 and 13 to 17, in both Tables, are green grey glasses; Examples 18 to 22 are grey glasses; Examples 23 to 25 are bronze glasses and Examples 12 and 26 to 28 are blue glasses. As mentioned hereinbefore, there is no "standard" clear glass composition because, for example, the various raw materials used for making glass have varying compositions depending upon the source from which they are obtained or the glass manufacturer has a particular composition which he prefers to use. Accordingly, Examples 29 and 31 show clear glasses having different compositions from that shown in Example 1 and Examples 30 and 32 show tinted glasses, which are grey-green, having densities matched to those of these two clear glasses respectively.

From the Tables, it will be clearly seen that the densities of the tinted glasses are closely matched with the corresponding clear glass. Moreover, the working range, that is to say, the difference the working temperature and the liquidus temperature has been increased. We have found that, by carrying out the method of the present invention, the changeover from making a clear glass to a tinted glass can be shortened by hours and the changeover from tinted glass to clear glass can be shortened by days. Furthermore, from the spectral values given, it can clearly be seen that glasses having the requisite luminous, infra-red and ultraviolet transmissions can be obtained.

Various modifications may be made to the method of the present invention without departing from the scope thereof Thus, for example, although the above description is primarily concerned with effecting a changeover from clear glass to tinted glass and vice versa, the method may equally easily be used for effecting a changeover between two different tinted glasses.

We claim:

1. A method for making different glasses, which comprises:
   (1) supplying a glass making composition to a glass making furnace and forming a first glass; and
   (2) changing the glass making composition that is being supplied to the glass making furnace by interchanging iron oxide and alkaline earth metal oxide in the composition so that the density of the glass produced after said change in glass making composition is within 0.01 g/cm³ of the density of the glass produced before said change in glass making composition to form a second glass.

2. A method of making glass as recited in claim 1 wherein at least one of said first and said second glasses is a clear glass.

3. A method as recited in claim 1 wherein at least one of said first and said second glasses is a tinted glass.

4. A method as recited in claim 1 wherein both of said glass making compositions form tinted glass containing iron oxide.

5. A method as recited in claim 4 wherein at least one of said tinted glasses contains at least 0.7 weight% iron.

6. A method as recited in claim 4 wherein at least one of said tinted glasses contains at least 2 weight% iron.

7. A method as recited in claim 1 wherein one of said first and second glasses is a clear glass soda-lime-silica composition of $SiO_2$, $Na_2O$, CaO, MgO, $K_2O$ and $Al_2O_3$ and the other of said first and second glasses is a tinted glass which includes at least $Fe_2O_3$, CaO, $SiO_2$, $Na_2O$, MgO, $K_2O$ and $Al_2O_3$.

8. A method as recited in claim 7, wherein the concentration of CaO and MgO are each higher in said clear glass than in said tinted glass whereby the densities of the two glasses are maintained substantially equal to one another.

9. A method as recited in claim 4 wherein both said first and second glasses contain $Fe_2O_3$, one of said first and said second glasses containing more $Fe_2O_3$ than the other of said first and second glasses, wherein the densities of the two glasses are maintained substantially equal by reducing the amount of CaO in said glass containing the greater amount of $Fe_2O_3$ relative to the amount of CaO present in said glass containing the lesser amount of CaO.

10. A method as recited in claim 1 wherein one of said first and said second glasses contains:

| | |
|---|---|
| A% | CaO |
| B% | MgO |
| C% | $Na_2O + K_2O$ |
| D% | $SiO_2 + Al_2O_3$ | and the other of said first and said second glasses contains:

| | |
|---|---|
| X% | Total Iron (expressed as $Fe_2O_3$) |
| (A − 0.5 X) % to [(A + 0.5 X) %] (A − 1.5 X) % | CaO |
| B% to (B − X) % | MgO |
| C% to (C + 0.5 X) % | $Na_2O + K_2O$ |
| D% | $SiO_2 + Al_2O_3$ | while the proviso that the amount of MgO tends to (B−X)% when the amount of CaO tends to [(A−0.5X)%] (A−1.5X)%.

11. A method as recited in claim 10 wherein A is from 5% to 9.5%, B is from 0% to 5%, C is from 10% to 18%, D has a maximum value of 75% with the amount of $SiO_2$ lying within the range of 68% to 73% and the amount of $Al_2O_3$ lying within the range of 0% to 5%, and X lies within the range of from 0.7% to 5%.

12. A method as recited in claim 1 wherein the difference in density between said first glass and said second glass is less than 0.005 g/cm³.

13. A method as recited in claim 1 wherein each of said glass has a refractive index and said refractive indices differ by less than 0.004.

14. A method as recited in claim 4 wherein the iron content, measured as $Fe_2O_3$, of said compositions producing said first and said second glasses differs by at least 1%.

15. In a method for changing the glass produced from a continuous glass making process, which comprises continuously supplying a glass making composition to a glass making furnace and forming glass, the improvement which comprises:
   changing the glass making composition, which contains iron oxide or calcium oxide or both, by interchanging iron oxide and calcium oxide in the composition so that the density of the glass produced after said change in glass making composition is within 0.01 g/cm³ of the density of the glass produced before said change in glass making composition.

16. The method according to claim 15, wherein iron oxide is interchanged with calcium oxide and magnesium oxide so that the density of the glass produced after said change in glass making composition is within 0.01 g/cm$^3$ of the density of the glass produced before said change in glass making composition.

* * * * *

UNITED STATES PATENT AND TRADEMARK OFFICE
CERTIFICATE OF CORRECTION

PATENT NO. : 5,827,344  
DATED : October 27, 1998  
INVENTOR(S) : Fyles et al.

Page 1 of 1

It is certified that error appears in the above-identified patent and that said Letters Patent is hereby corrected as shown below:

<u>Column 14,</u>  
Line 34, please delete -- $[(A + 0.5X)\%]$ --.  
Line 40, please delete -- $[(A - 0.5X)\%]$ --.

Signed and Sealed this

Twenty-seventh Day of November, 2001

Attest:

NICHOLAS P. GODICI  
Attesting Officer     Acting Director of the United States Patent and Trademark Office